United States Patent
Alfredsson

(10) Patent No.: US 6,848,548 B2
(45) Date of Patent: Feb. 1, 2005

(54) HYDRAULIC REGULATING SYSTEM FOR A VEHICLE TRANSMISSION

(75) Inventor: Sverker Alfredsson, Vastra Frolunda (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 10/149,770

(22) PCT Filed: Dec. 11, 2000

(86) PCT No.: PCT/SE00/02483
§ 371 (c)(1),
(2), (4) Date: Oct. 21, 2002

(87) PCT Pub. No.: WO01/50040
PCT Pub. Date: Jul. 12, 2001

(65) Prior Publication Data
US 2003/0075408 A1 Apr. 24, 2003

(30) Foreign Application Priority Data
Dec. 13, 1999 (SE) .............................. 9904549

(51) Int. Cl.⁷ .............................................. F15H 61/14
(52) U.S. Cl. ...................... 192/3.25; 74/733.1; 192/3.3; 192/3.33; 192/3.63
(58) Field of Search ................................ 192/3.29, 3.3, 192/3.33, 3.25, 3.26, 3.27, 3.58, 3.63; 74/733.1

(56) References Cited

U.S. PATENT DOCUMENTS

| | | | |
|---|---|---|---|
| 4,262,554 A | * | 4/1981 | Ahlen et al. ................ 475/137 |
| 4,819,430 A | | 4/1989 | Becker |
| 4,846,765 A | * | 7/1989 | Sakai ........................ 74/731.1 |
| 4,898,050 A | * | 2/1990 | Sakai ........................... 477/38 |
| 5,065,645 A | | 11/1991 | Nagase et al. |
| 5,573,473 A | | 11/1996 | Asayama et al. |
| 6,250,180 B1 | * | 6/2001 | Legner et al. ............. 74/733.1 |

* cited by examiner

Primary Examiner—Rodney H. Bonck
(74) Attorney, Agent, or Firm—Young & Thompson

(57) ABSTRACT

Hydraulic control system for a vehicle transmission connected to an output shaft from a hydraulic torque converter (1) with a hydraulically operated disc clutch for locking the torque converter and which has two hydraulically operated disc clutches for shifting. The control system has a low pressure circuit (30) with a low-pressure pump feeding fluid through the torque converter, and a high pressure circuit (34) with a high-pressure pump (35), which feeds fluid via valves (38) to the disc clutches. The high-pressure pump has variable displacement, which is regulated by the operating pressure of the disc clutch of the torque converter, so that the high-pressure pump is set to a lower displacement when this last-mentioned clutch is engaged than when it is disengaged.

8 Claims, 2 Drawing Sheets

HYDRAULIC REGULATING SYSTEM FOR A VEHICLE TRANSMISSION

CROSS REFERENCE TO RELATED APPLICATION

This is the 35 USC 371 national stage of International Application PCT/SE00/02483 filed on Dec. 11, 2000, which designated the United States of America.

FIELD OF THE INVENTION

The present invention relates to a hydraulic control system for a vehicle transmission, connected to an output shaft from a hydraulic torque converter with a hydraulically operated friction clutch for locking up the torque converter and which has at least two hydraulically operated clutch units for shifting between the various gear speeds of the transmission, comprising a first hydraulic pump, which feeds, via a counterbalance valve, oil at low pressure to the torque converter, and a second hydraulic pump which feeds, via regulator valve means, oil at high pressure to first, second and third piston-cylinder devices, each operating an individual one of said friction clutch and clutch units.

BACKGROUND OF THE INVENTION

In known transmissions of this type, the torque converter is active only during the vehicle starting phase when it up to doubles the input torque in the transmission. After start, the torque converter is locked up with the aid of the hydraulically operated friction clutch so that its input and output shafts rotate as a unit. The reason the torque converter is only utilized during starting is that it has a low efficiency compared to a toothed transmission. When the torque converter is in operation, the losses are absorbed as heat in the fluid circulating through the same. The fluid must be cooled in a heat exchanger and the more fluid which the first pump pumps through the torque converter, the lower will be the fluid temperature and the smaller the heat exchanger can be made for a given amount of heat.

Fluid from the pump with the higher pressure is directed via magnetic valves to the piston-cylinder devices, which control the lock-up clutch of the torque converter, and shift clutches in the form of multi-disc clutches. For shifting, one clutch is engaged and the other is released. A transmission of this type, a so-called "power-shift" transmission, is shown and described in SE-8700583-1 for example. High pressure and a great quantity of fluid is required during shifting, i.e. when pressing together the discs of the shift clutches, and for engaging the lock-up clutch, and this means it is necessary to dimension the high-pressure pump for the highest required pressure and flow. This means, however, that the high-pressure pump will have a much too high capacity for all other operations where fluid is only required to replace leakage, so that the pressure in the clutches will not drop. Since the shifting time during driving only amounts to a few percent of the total driving time, it will be understood that significant energy savings could be realized with another system for supplying fluid to the piston cylinder devices of the clutches.

SUMMARY OF THE INVENTION

The purpose of the present invention is to achieve a hydraulic control system of the type described by way of introduction, which uses less energy than corresponding hitherto known control systems, at the same time as it is uncomplicated.

This is achieved according to the invention by virtue of the fact that the second pump is a high-pressure pump with variable displacement, which is controlled by a pressure-regulator valve, and that means are arranged to control the pressure-regulator valve to set the variable pump at maximum displacement when the friction clutch is disengaged, and to a lower displacement when the friction clutch is engaged.

When the torque converter is activated, it can double the engine torque into the shift clutches in the transmission and the variable pump can then provide a clutch pressure which is higher than that required when driving with a locked-up torque converter. By allowing existing means for controlling the lock-up clutch to also participate in the controlling of the variable high-pressure pump, this pump is automatically switched at the correct moment.

In a preferred embodiment of a control system according to the invention, a control circuit for controlling the piston-cylinder device of the friction clutch is coupled to means which control the counterbalance valve so that, when the friction clutch is disengaged, the operating pressure will set the counterbalance valve to provide a higher pressure through the torque converter, and that the pressure-regulator valve is so controlled by the pressure set by the counterbalance valve that it sets the variable high-pressure pump to maximum displacement at said higher pressure. Here the pressure rise through the torque converter, which is intended to avoid cavitation when activated, is used to switch the pressure regulator valve, which in turn changes the pump setting.

BRIEF DESCRIPTION OF THE DRAWINGS

The invention will be described in more detail below with reference to examples shown in the accompanying drawings, where.

DETAILED DESCRIPTION OF THE INVENTION

Figure 1:
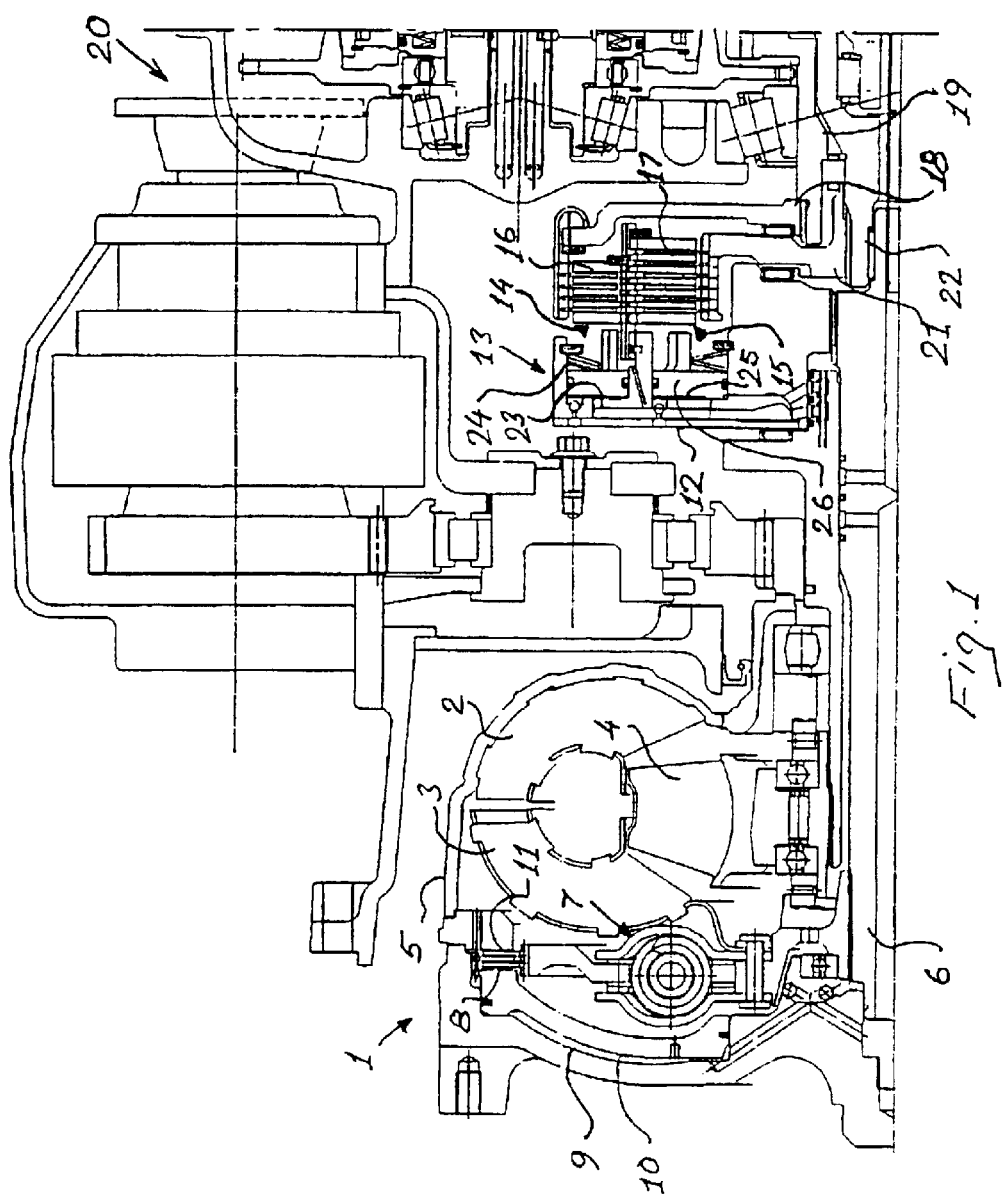
FIG. 1 shows a longitudinal section through a portion of a torque converter with a transmission joined thereto.

In FIG. 1, 1 generally designates a hydraulic torque converter of a type known per se, having a pump 2, a turbine 3 and a stator 4. The pump 2 is solidly joined to a housing 5, intended to be securely connected to an engine flywheel (not shown), while the turbine 3 is joined to an output shaft 6 from the torque converter 1. The turbine 2 and the housing 5 can be locked together with the aid of a lock-up disc clutch, generally designated 7, which has discs 8 non-rotatably joined to the output shaft 6. By means of a first hydraulic-piston cylinder device, comprising a piston 10 housed in a cylinder chamber 9, the discs 8 are pressed against a pressure plate 11 non-rotatably joined to the housing 5 to lock the housing 5 and the output shaft 6, to thereby eliminate losses in the torque converter after the vehicle has started rolling.

The output shaft 6 from the torque converter 1 is non-rotatably joined to a housing 12 constituting a part of a double clutch, generally designated 13, which consists of a first and a second clutch unit 14 and 15, respectively, having two concentrically arranged first and second disc packages 16 and 17, respectively. The first clutch unit 14 has discs which are joined to a hub 18, which is non-rotatably joined to a tubular shaft 19, which is a first input shaft in a power-shift gearbox, generally designated 20. The second clutch unit 15 has discs which are joined to a hub 21 which is non-rotatably joined to a shaft 22, which is mounted inside the first shaft and which is a second input shaft to the gearbox 20. By means of a first hydraulic piston-cylinder device, comprising a piston 24 in a cylinder chamber 23, the discs of the first clutch unit 14 can be pressed together to lock the output shaft 6 of the torque converter to the first input shaft 19 of the gearbox 20. By means of a second hydraulic piston-cylinder device, comprising a piston 26 in a cylinder chamber 25, the discs of the second clutch unit 15 can be pressed together to lock the output shaft 6 of the torque converter to the second input shaft 22 of the gearbox.

Figure 2:
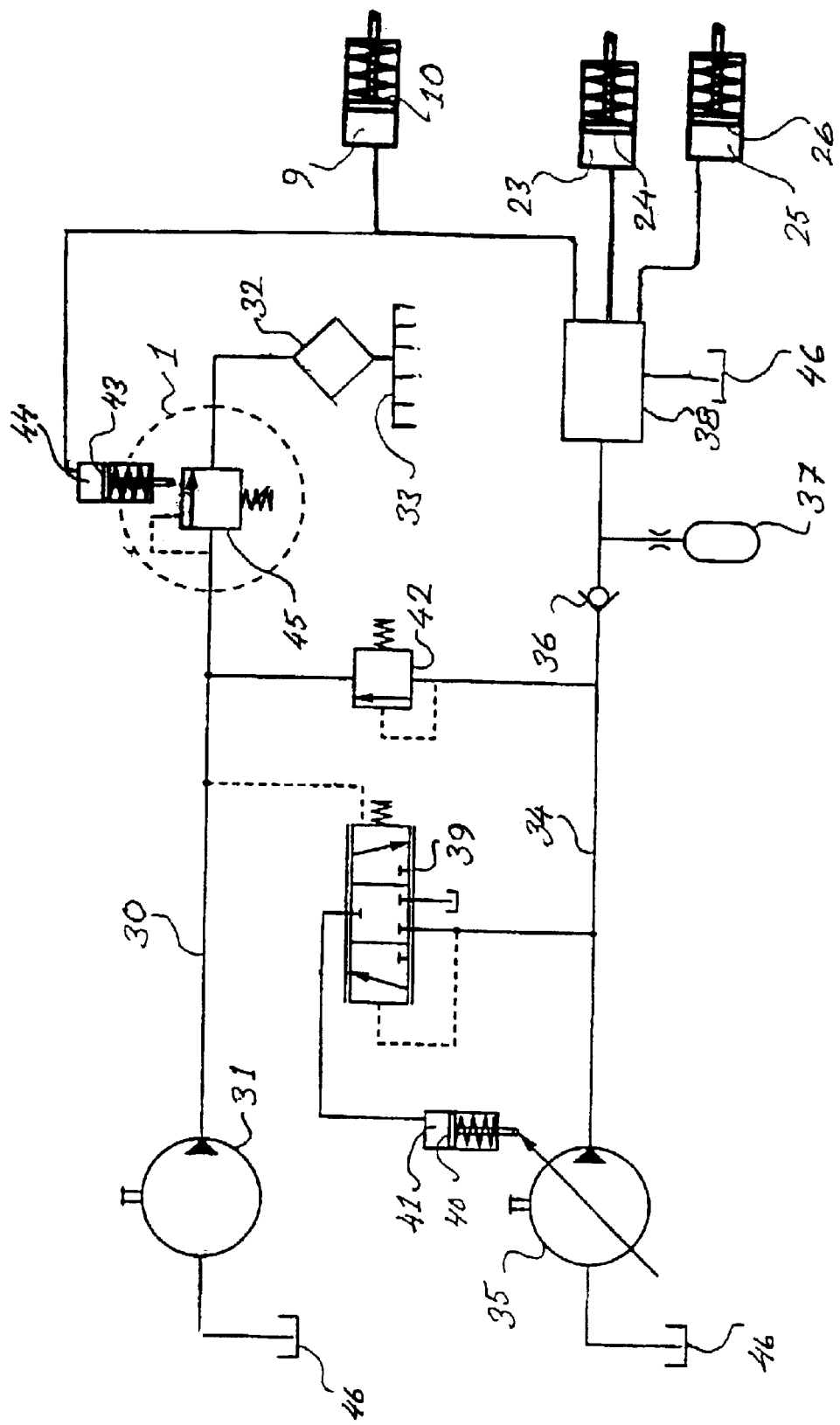
FIG. 2 shows a circuit diagram of a control system for controlling the torque converter and the transmission clutches.

In the circuit diagram in FIG. 2, the clutches themselves have been left out and only the associated piston-cylinder devices 10, 9, 24, 23, 26, 25, for engagement and disengagement of the respective clutch are shown. The control system comprises a low-pressure circuit 30 with a low-pressure pump 31, pumping fluid through the torque converter 1 and a heat exchanger 32 to the lubrication points 33 in the gearbox. The low-pressure pump has preferably a fixed displacement. The control system also comprises a high-pressure circuit 34 with a high-pressure pump 35 which pumps fluid, via a non-return valve 36, to a pressure accumulator 37, and a valve package 38, comprising three electromagnetically operated hydraulic valves (not shown) for operating the piston-cylinder devices 10, 9, 24, 23, 26, 25. The high-pressure pump 35 has a variable displacement, which is regulated with the aid of a piston-cylinder device 40, 41, controlled by a pressure-regulator valve 39. The high-pressure circuit 34 communicates with the low-pressure circuit 30 via a pressure-limiting valve 42, which determines the maximum pressure in the high-pressure circuit 34. It can in this case be set to a maximum pressure of circa 15 bar. In addition to the components described above, the control system has a counterbalance valve 45, switchable by a piston-cylinder device 43, 44. The counterbalance valve 45 determines the pressure in the oil flowing through the torque converter 1 and the heat exchanger 32 to the lubrication points 33. The oil is pumped from and back to an oil sump 46.

The pressure in the operating cylinder 9 of the lock-up clutch 7 thus determines the setting of the counterbalance valve 45 and thereby the pressure in the low-pressure circuit 30, which controls the pressure-regulating valve 39, which in turn sets the displacement of the high-pressure pump 35. This means that the setting of the clutch 7 will determine the pressure level and the flow in the high-pressure circuit 32.

When the vehicle is starting off, the lock-up clutch 7 is disengaged and torque is transmitted with amplification via the torque converter 1. The pressure in the operating cylinder 9 of the clutch 7, and consequently also in the control cylinder 44 of the counterbalance valve 45, is low, which means that there will be a high pressure in the oil flowing through the torque converter, to avoid cavitation therein. A higher pressure in the low-pressure circuit can be about 4 bar, which is to be compared with a lower pressure of circa 1 bar, when the low-pressure circuit only pumps oil for lubrication. The higher pressure in the low-pressure circuit sets the pressure-regulator valve 39 to a position such that the high-pressure pump 35 is set for maximum flow and pressure, to provide maximum operating pressure and thus maximum engagement force to the currently engaged shift clutch 14 or 15. The pump 35 is thus selected so that, with this setting, a certain flow occurs over the pressure-limiting valve 42 to the low-pressure circuit, i.e. an excess of flow through the torque converter. Increased flow provides better cooling, which means that the heat exchanger 32 can be dimensioned smaller than if this excess were lacking.

After starting off, when the torque converter no longer needs to be active, the valves in the valve package 38 are set so that the operating cylinder 9 of the lock-up clutch 7 is supplied with oil under pressure, thereby engaging the lock-up clutch. At the same time, the control cylinder 44 of the counterbalance valve 45 is pressurized so that the valve opens and reduces the pressure in the low-pressure circuit to lubricating pressure of circa 1 bar. The lower pressure in the low-pressure circuit reduces the operating pressure of the pressure-regulator valve 39, which results in valve-resetting with subsequent reduction of the displacement of the high-pressure pump, so that the pressure in the high-pressure circuit is reduced to a level of circa 10 bar, which is the pressure sufficient to keep the respective shift clutch 14, 15 engaged with sufficient engaging force during normal operation.

As an alternative to the embodiment described, in which changes in pressure in the operating cylinder of the lock-up clutch 7 indirectly, via pressure change in the low-pressure circuit 30, reset the pressure-regulator valve 39, there is conceivable an embodiment (not shown), in which the operating pressure of the clutch 7 acts directly on the control piston of the pressure-regulator valve 39.

What is claimed is:

1. Hydraulic control system for a vehicle transmission, connected to an output shaft from a hydraulic torque converter with a hydraulically operated friction clutch for locking up the torque converter and which has at least two hydraulically operated clutch units for shifting between the various gear speeds of the transmission, comprising a first hydraulic pump, which feeds, via a counterbalance valve, oil at low pressure to the torque converter; and a second hydraulic pump which feeds, via regulator valve means, oil at high pressure to first, second and third piston-cylinder devices, each operating an individual one of said friction clutch and clutch units; wherein the second pump is a variable high-pressure pump with variable displacement, which is controlled by a pressure-regulator valve, and control means are arranged to control the pressure-regulator valve to set the variable high-pressure pump at maximum displacement when the friction clutch is disengaged, and to a lower displacement when the friction clutch is engaged.

2. The control system according to claim 1, wherein the control means are arranged to set the counterbalance valve to provide a higher pressure through the torque converter when the friction clutch is disengaged than when engaged, and the pressure-regulator valve is controlled so that the variable high-pressure pump is set to maximum displacement when there is higher pressure through the torque converter.

3. The control system according to claim 2, wherein a control circuit for controlling the piston-cylinder device of the friction clutch is coupled to the control means which control the counterbalance valve so that, when the friction clutch is disengaged, the operating pressure will set the counterbalance valve to provide a higher pressure through the torque converter, and the pressure-regulator valve is so controlled by the pressure set by the counterbalance valve that the variable high-pressure pump is set to maximum displacement at said higher pressure.

4. The control system according to claim 3, wherein a pressure-limiting valve is disposed between the output side of the variable high-pressure pump and the input side of the torque converter; said pressure-limiting valve limiting the pressure in a control circuit to the regulator valve means regulating the pressure in said piston-cylinder devices.

5. The control system according to claim 4, wherein a pressure accumulator is disposed in the control circuit to the regulator valve means between non-return means and said regulator valve means.

6. The control system according to claim 2, wherein a pressure-limiting valve is disposed between the output side of the variable high-pressure pump and the input side of the torque converter; said pressure-limiting valve limiting the pressure in a control circuit to the regulator valve means regulating the pressure in said piston-cylinder devices.

7. The control system according to claim 1, wherein a pressure-limiting valve is disposed between the output side of the variable high-pressure pump and the input side of the torque converter; said pressure-limiting valve limiting the pressure in a control circuit to the regulator valve means regulating the pressure in said piston-cylinder devices.

8. The control system according to claim 7, wherein a pressure accumulator is disposed in the control circuit to the regulator valve means between non-return means and said regulator valve means.

* * * * *